US011658922B2

(12) United States Patent
Brewer et al.

(10) Patent No.: US 11,658,922 B2
(45) Date of Patent: May 23, 2023

(54) OPTIONAL PATH ORDERING IN PACKET-BASED NETWORK

(71) Applicant: Micron Technology, Inc., Boise, ID (US)

(72) Inventors: Tony Brewer, Plano, TX (US); David Patrick, McKinney, TX (US)

(73) Assignee: Micron Technology, Inc., Boise, ID (US)

(*) Notice: Subject to any disclaimer, the term of this patent is extended or adjusted under 35 U.S.C. 154(b) by 187 days.

(21) Appl. No.: 17/007,224

(22) Filed: Aug. 31, 2020

(65) Prior Publication Data

US 2022/0070115 A1     Mar. 3, 2022

(51) Int. Cl.
*H04L 49/109* (2022.01)
*H04L 47/34* (2022.01)
*H04L 69/22* (2022.01)
*G06F 15/78* (2006.01)

(52) U.S. Cl.
CPC ............ *H04L 49/109* (2013.01); *H04L 47/34* (2013.01); *H04L 69/22* (2013.01); *G06F 15/7825* (2013.01)

(58) Field of Classification Search
CPC ........ H04L 49/111; H04L 47/34; H04L 69/22; H04L 49/25; G06F 15/7825
USPC ........................................................ 370/389
See application file for complete search history.

(56) References Cited

U.S. PATENT DOCUMENTS

| 5,517,500 | A  | 5/1996  | White et al. |
| 11,392,527 | B2 | 7/2022  | Brewer et al. |
| 2007/0286152 | A1 | 12/2007 | Prakash et al. |
| 2010/0318882 | A1 | 12/2010 | Cantillo et al. |

(Continued)

FOREIGN PATENT DOCUMENTS

| EP | 2774334 B1 | 1/2020 |
| EP | 3664383 A1 | 6/2020 |

(Continued)

OTHER PUBLICATIONS

"U.S. Appl. No. 17/007,247, Response filed Feb. 11, 2022 to Non Final Office Action dated Nov. 12, 2021", 13 pgs.

(Continued)

*Primary Examiner* — Kwang B Yao
*Assistant Examiner* — Syed M Bokhari
(74) *Attorney, Agent, or Firm* — Schwegman Lundberg & Woessner, P.A.

(57) ABSTRACT

A system may include multiple electronic devices and multiple hardware transceivers. The multiple electronic devices may include multiple chiplets and may be coupled to each other via an interface network. The multiple hardware transceivers may each be included in or coupled to a respective electronic device of the multiple electronic devices. The multiple hardware transceivers may each be configured to receive data packets from a source device. The data packets each include a protocol field specifying ordering information for delivery to a destination device and a path field specifying path information for routing the delivery to the destination device. The source device and the destination device may each include a chiplet. The multiple hardware transceivers may each be further configured to transmit the received data packets to the destination device (Continued)

using at least the ordering information of each received data packet.

20 Claims, 6 Drawing Sheets

(56) References Cited

U.S. PATENT DOCUMENTS

| | | | |
|---|---|---|---|
| 2012/0303528 A1 | 11/2012 | Weiner et al. | |
| 2013/0114598 A1 | 5/2013 | Schrum et al. | |
| 2013/0332711 A1 | 12/2013 | Leidel et al. | |
| 2018/0052685 A1 | 2/2018 | Ouyang et al. | |
| 2019/0155779 A1 | 5/2019 | Dropps et al. | |
| 2019/0171604 A1* | 6/2019 | Brewer | G06F 13/4022 |
| 2019/0243700 A1* | 8/2019 | Brewer | H04L 9/40 |
| 2019/0288940 A1 | 9/2019 | Filsfils et al. | |
| 2019/0303217 A1 | 10/2019 | Desai et al. | |
| 2019/0340035 A1 | 11/2019 | Brewer | |
| 2019/0363989 A1 | 11/2019 | Shalev et al. | |
| 2020/0059318 A1 | 2/2020 | Schulz | |
| 2020/0293195 A1* | 9/2020 | Noy | G06F 13/385 |
| 2021/0303481 A1* | 9/2021 | Ray | G06T 1/60 |
| 2021/0312697 A1 | 10/2021 | Maiyuran et al. | |
| 2022/0066971 A1 | 3/2022 | Brewer et al. | |

FOREIGN PATENT DOCUMENTS

| | | |
|---|---|---|
| WO | WO-2022046278 A1 | 3/2022 |
| WO | WO-2022046279 A1 | 3/2022 |

OTHER PUBLICATIONS

U.S. Appl. No. 17/007,247, filed Aug. 31, 2020, Ordered Delivery of Data Packets Based on Type of Path Information in Each Packet.
"International Application Serial No. PCT/US2021/039519, International Search Report dated Oct. 14, 2021", 3 pgs.
"International Application Serial No. PCT/US2021/039519, Written Opinion dated Oct. 14, 2021", 8 pgs.
"International Application Serial No. PCT/US2021/039524, International Search Report dated Oct. 14, 2021", 3 pgs.
"International Application Serial No. PCT/US2021/039524, Written Opinion dated Oct. 14, 2021", 5 pgs.

* cited by examiner

US 11,658,922 B2

OPTIONAL PATH ORDERING IN PACKET-BASED NETWORK

BACKGROUND

Chiplets are an emerging technique for integrating various processing functionalities. Generally, a chiplet system is made up of discrete modules (each a "chiplet") that are integrated on an interposer, and in many examples interconnected as desired through one or more established networks, to provide a system with the desired functionality. The interposer and included chiplets may be packaged together to facilitate interconnection with other components of a larger system. Each chiplet may include one or more individual integrated circuits, or "chips" (ICs), potentially in combination with discrete circuit components, and commonly coupled to a respective substrate to facilitate attachment to the interposer. Most or all chiplets in a system will be individually configured for communication through the one or more established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems may include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets. Chiplets also support the tight integration of IP blocks that can otherwise be difficult, such as those manufactured using different processing technologies or using different feature sizes (or utilizing different contact technologies or spacings). Thus, multiple IC's or IC assemblies, with different physical, electrical, or communication characteristics may be assembled in a modular manner to provide an assembly providing desired functionalities. Chiplet systems can also facilitate adaptation to suit needs of different larger systems into which the chiplet system will be incorporated. In an example, IC's or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

FIG. 1, described below, offers an example of a chiplet system and the components operating therein. Within the context of such a chiplet system, packet transmission can be controlled using information contained in each packet indicating one or more requirements for delivering that packet from a source endpoint (e.g., a chiplet) to a destination endpoint (e.g., another chiplet). Packets containing various types of information used in the operations of the chiplet system are transmitted within the system. Some use cases may not require delivery of packets in any particular order. Other use cases may require ordered delivery from the source endpoint to the destination endpoint for correct operation of the system. Some use cases may require ordered delivery for packets that share a common characteristic, such as a common address or a common transaction identifier. Some use cases may not require delivery of packets through a particular path. The other use cases may require delivery of packets through a particular path. A system that forces all packets to be ordered for delivery through predetermine paths, for example, can satisfy all the use cases, but may result in inefficient overall packet transmission performance in the system. For example, packets that need ordered delivery from a source point to a destination point can be delivered at various orders and/or through different paths as arranged for avoiding congestion. Thus, there is a need for supporting all the use cases discussed above to provide a system, such as the chiplet system of FIG. 1, with packet transmission with high flexibility and high performance for various applications.

The present subject matter controls packet transmission in a system, such as the chiplet system of FIG. 1, using information contained in each of the packets being transmitted. The packets being transmitted can each include two fields specifying whether the packet requires an ordered delivery and whether the packet requires a particular path of delivery. The two fields can include a first field containing order information (referred to as the protocol field, for example) and a second field containing path information (referred to as the path field, for example). In one example, the protocol field indicates whether unordered delivery is used (e.g., to allow delivery with a random order), ordered delivery through a single predetermined path (e.g., designed into the system) is used, or ordered delivery through a path specified by the path field is used.

Use of the order and path fields in packets provides flexible system support for multiple ordering requirements, without degrading performance for use cases that do not require all packets to be ordered. Because the ordering information is provided in every packet, instead of setting the ordering scheme as a configuration mode at system boot time, packets with different ordering requirements can be transmitted in the system simultaneously.

Figure 1A:
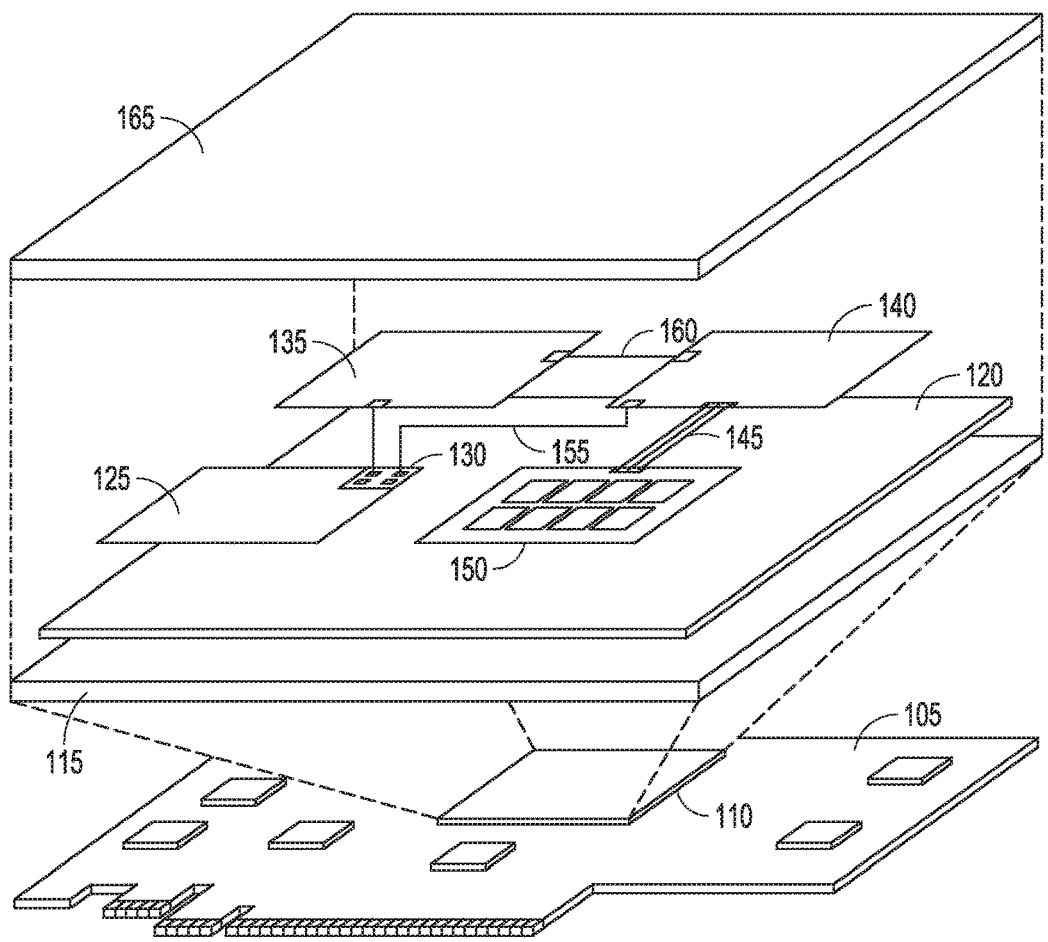
FIGS. 1A and 1B illustrate an example of a chiplet system, according to an embodiment.
Figure 1B:
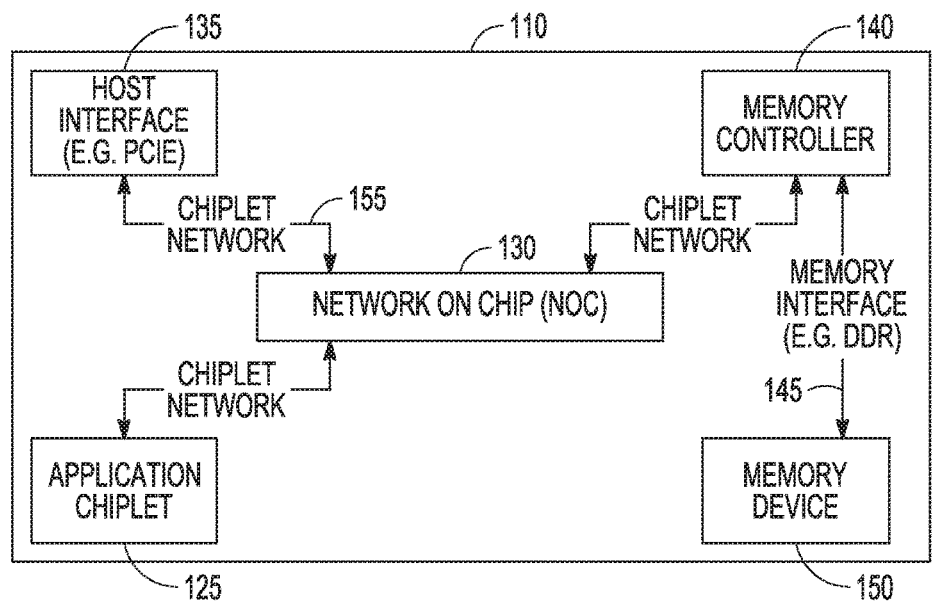

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets, an application chiplet 125, a host interface chiplet 135, a memory controller chiplet 140, and a memory device chiplet 150. Other systems may include many additional chiplets to provide additional functionalities as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments NOC 130 may be included on the application chiplet 125. In an example, NOC 130 may be defined in response to selected support chiplets (e.g., chiplets 135, 140, and 150) thus enabling a designer to select an appropriate number or chiplet network connections or switches for the NOC 130. In an example, the NOC 130 can be located on a separate chiplet, or even within the interposer 120. In examples as discussed herein, the NOC 130 implements a chiplet protocol interface (CPI) network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or double data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB principal or subordinate depending on which chiplet provides the master clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

AIB channels are typically configured as half TX data plus half RX data, all TX data, or all RX data plus associated clocks and miscellaneous control. The number of TX versus RX data signals is determined at design time and cannot be configured as part of system initialization, in some example embodiments.

The CPI packet protocols (point-to-point and routable) use symmetrical receive and transmit I/O cells within an AIB channel. The CPI streaming protocol allows more flexible use of the AIB I/O cells. An AIB channel for streaming mode may configure the I/O cells as all TX, all RX, or half TX and half RX, in some example embodiments.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency may be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five entries (e.g., one entry for each unit time). If four virtual channels are supported, then the recipient has twenty buffers arranged in five entries. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return that indicates buffer space available for the sender can then be used by the sender allow transmitting of additional information.

Also illustrated is a chiplet mesh network 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR 6), can also be used to interconnect chiplets. Connection of a chiplet system or individual chiplets to external devices (such as a larger system can be through a desired interface (for example, a PCIE interface). Such as external interface may be implemented, in an example, through a host interface chiplet 135, which in the depicted example, provides a PCIE interface external to chiplet system 110. Such dedicated interfaces 145 are generally employed when a convention or standard in the industry has converged on such an interface. The illustrated example of a DDR interface 145 connecting the memory controller chiplet 140 to a dynamic random access memory (DRAM) memory device 150 is just such an industry convention.

Of the variety of possible support chiplets, the memory controller chiplet 140 is likely present in the chiplet system 110 due to the near omnipresent use of storage for computer processing as well as sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operation execution. For some types of memory, maintenance operations tend to be specific to the memory device 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh may be controlled by a host processor or of a memory controller at some times, and at other times controlled by the DRAM memory device, or by logic associated with one or more DRAM devices, such as an interface chip (in an example, a buffer).

Atomic operations are a data manipulation that, for example, may be performed by the memory controller chiplet 140. In other chiplet systems, the atomic operations may be performed by other chiplets. For example, an atomic operation of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the commands success to the application chiplet 125. Atomic operations avoid transmitting the data across the chiplet network 160, resulting in lower latency execution of such commands.

Atomic operations can be classified as built-in atomics or programmable (e.g., custom) atomics. Built-in atomics are a finite set of operations that are immutably implemented in hardware. Programmable atomics are small programs that can run on a programmable atomic unit (PAU) (e.g., a custom atomic unit (CAU)) of the memory controller chiplet 140. FIG. 1 illustrates an example of a memory controller chiplet that discusses a PAU.

The memory device chiplet 150 can be, or include any combination of, volatile memory devices or non-volatile memories. Examples of volatile memory devices include, but are not limited to, random access memory (RAM)—such as DRAM) synchronous DRAM (SDRAM), graphics DDR type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device 150 as a chiplet, however, the memory device 150 can reside elsewhere, such as in a different package on the board 105. For many applications, multiple memory device chiplets may be provided. In an example, these memory device chiplets may each implement one or multiple storage technologies. In an example, a memory chiplet may include, multiple stacked memory die of different technologies, for example one or more SRAM devices stacked or otherwise in communication with one or more DRAM devices. Memory controller 140 may also serve to coordinate operations between multiple memory chiplets in chiplet system 110; for example, to utilize one or more memory chiplets in one or more levels of cache storage, and to use one or more additional memory chiplets as main memory. Chiplet system 110 may also include multiple memory controllers 140, as may be used to provide memory control functionality for separate processors, sensors, networks, etc. A chiplet architecture, such as chiplet system 110 offers advantages in allowing adaptation to different memory storage technologies; and different memory interfaces, through updated chiplet configurations, without requiring redesign of the remainder of the system structure.

Figure 2:
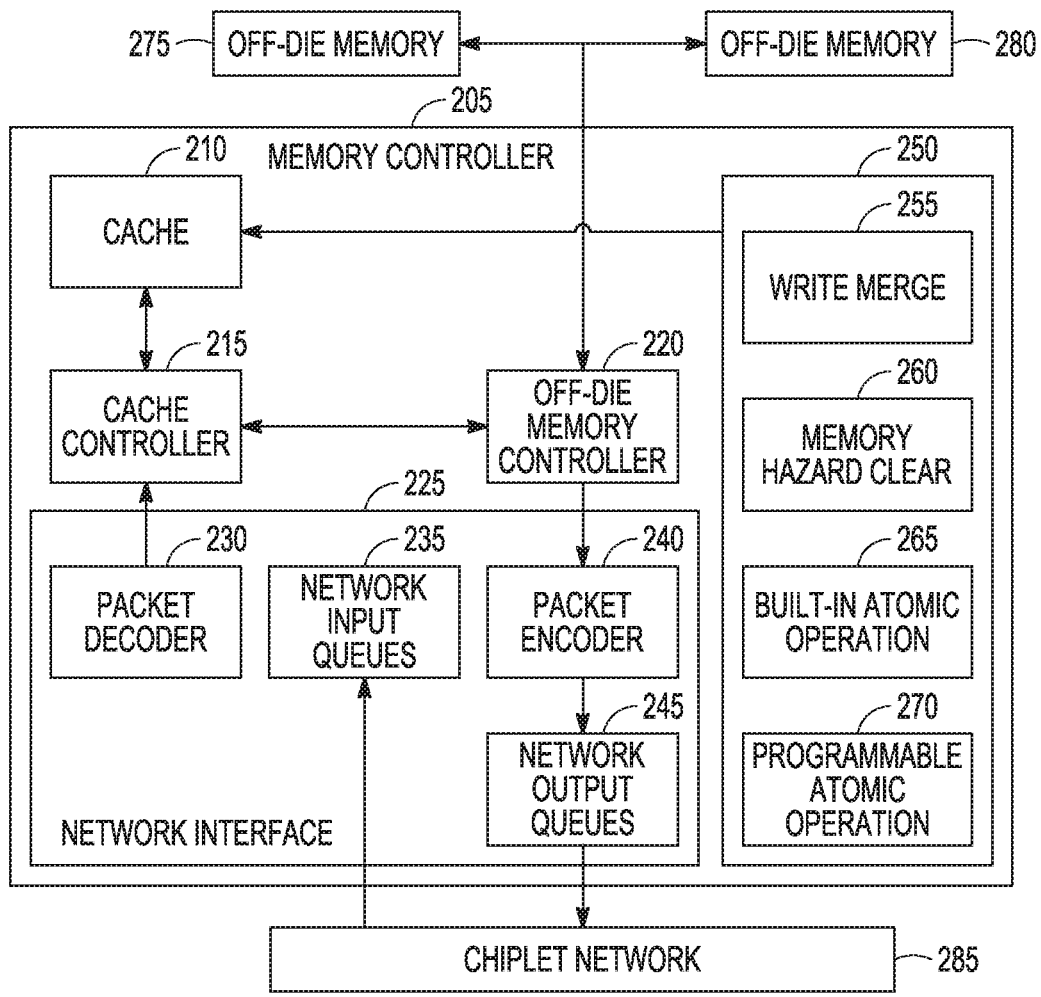
FIG. 2 illustrates components of an example of a memory controller chiplet, according to an embodiment.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 175), a network communication interface 225 (e.g., to interface with a chiplet network 180 and communicate with other chiplets), and a set of atomic and merge operations 250. Members of this set can include, for example, a write merge unit 155, a hazard unit (160), built-in atomic unit 165, or a PAU 170. The various components are illustrated logically, and not as they necessarily would be implemented. For example, the built-in atomic unit 165 likely comprises different devices along a path to the off-die memory. For example, the built-in atomic unit could be in an interface device/buffer on a memory chiplet, as discussed above. In contrast, the programmable atomic operations 170 are likely implemented in a separate processor on the memory controller chiplet 105 (but in various examples may be implemented in other locations, for example on a memory chiplet).

The off-die memory controller 220 is directly coupled to the off-die memory 275 (e.g., via a bus or other communication connection) to provide write operations and read operations to and from the one or more off-die memory, such as off-die memory 275 and off-die memory 280. In the depicted example, the off-die memory controller 220 is also coupled for output to the atomic and merge operations unit 250, and for input to the cache controller 215 (e.g., a memory side cache controller).

In the example configuration, cache controller 215 is directly coupled to the cache 210, and may be coupled to the network communication interface 225 for input (such as incoming read or write requests), and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration, or a mesh network providing for additional connections, depending upon the configuration.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomic and merge operations 250, or both. As noted above, one or more levels of cache may also be implemented in off-die memories 275 or 280; and in some such examples may be accessed directly by cache controller 215. Data read by the off-die memory controller 220 can be cached in the cache 210 by the cache controller 215 for later use.

The atomic and merge operations 250 are coupled to receive (as input) the output of the off-die memory controller 220, and to provide output to the cache 210, the network communication interface 225, or directly to the chiplet network 285. The memory hazard clear (reset) unit 260, write merge unit 265 and the built-in (e.g., predetermined) atomic operations unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor.

The write merge unit 255 receives read data and request data, and merges the request data and read data to create a single unit having the read data and the source address to be used in the response or return data packet). The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 280.

When the request data is for a built-in atomic operation, the built-in atomic operations unit 265 receives the request and reads data, either from the write merge unit 265 or directly from the off-die memory controller 220. The atomic operation is performed, and using the write merge unit 255, the resulting data is written to the cache 210, or provided to the network communication interface 225 to encode and prepare a response or return data packet for transmission on the chiplet network 285.

The built-in atomic operations unit 265 handles predefined atomic operations such as fetch-and-increment or compare-and-swap. In an example, these operations perform a simple read-modify-write operation to a single memory location of 32-bytes or less in size. Atomic memory operations are initiated from a request packet transmitted over the chiplet network 285. The request packet has a physical address, atomic operator type, operand size, and optionally up to 32-bytes of data. The atomic operation performs the read-modify-write to a cache memory line of the cache 210, filling the cache memory if necessary. The atomic operator response can be a simple completion response, or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operations can also involve requests for a "standard" atomic operation on the requested data, such as comparatively simple, single cycle, integer atomics—such as fetch-and-increment or compare-and-swap—which will occur with the same throughput as a regular memory read or write operation not involving an atomic operation. For these operations, the cache controller 215 may generally reserve a cache line in the cache 210 by setting a hazard bit (in hardware), so that the cache line cannot be read by another process while it is in transition. The data is obtained from either the off-die memory 275 or the cache 210, and is provided to the built-in atomic operation unit 265 to perform the requested atomic operation. Following the atomic operation, in addition to providing the resulting data to the data packet encoder 240 to encode outgoing data packets for transmission on the chiplet network 285, the built-in atomic operation unit 265 provides the resulting data to the write merge unit 255, which will also write the resulting data to the cache circuit 210. Following the writing of the resulting data to the cache 210, any corresponding hazard bit which was set will be cleared by the memory hazard clear unit 260.

The PAU 270 enables high performance (high throughput and low latency) for programmable atomic operations (also referred to as "custom atomic operations"), comparable to the performance of built-in atomic operations. Rather than executing multiple memory accesses, in response to an atomic operation request designating a programmable atomic operation and a memory address, circuitry in the memory controller chiplet 205 transfers the atomic operation request to PAU 270 and sets a hazard bit stored in a memory hazard register corresponding to the memory address of the memory line used in the atomic operation, to ensure that no other operation (read, write, or atomic) is performed on that memory line, which hazard bit is then cleared upon completion of the atomic operation. Additional, direct data paths provided for the PAU 270 executing the programmable atomic operations allow for additional write operations without any limitations imposed by the bandwidth of the communication networks and without increasing any congestion of the communication networks.

The PAU 270 includes a multi-threaded processor, for example, such as a RISC-V ISA based multi-threaded processor, having one or more processor cores, and further having an extended instruction set for executing programmable atomic operations. When provided with the extended instruction set for executing programmable atomic operations, the PAU 270 can be embodied as one or more hybrid threading processors. In some example embodiments, the PAU 270 provides barrel-style, round-robin instantaneous thread switching to maintain a high instruction-per-clock rate.

Programmable atomic operations can be performed by the PAU 270 involving requests for a programmable atomic operation on the requested data. A user can prepare programming code to provide such programmable atomic operations. For example, the programmable atomic operations can be comparatively simple, multi-cycle operations such as floating-point addition, or comparatively complex, multi-instruction operations such as a Bloom filter insert. The programmable atomic operations can be the same as or different than the predetermined atomic operations, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic operation. Following the atomic operation, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache control circuit 215.

In selected examples, the approach taken for programmable atomic operations is to provide multiple, generic, custom atomic request types that can be sent through the chiplet network 285 to the memory controller chiplet 205 from an originating source such as a processor or other system component. The cache controllers 215 or off-die memory controller 220 identify the request as a custom atomic and forward the request to the PAU 270. In a representative embodiment, the PAU 270: (1) is a programmable processing element capable of efficiently performing a user defined atomic operation; (2) can perform load and stores to memory, arithmetic and logical operations and control flow decisions; and (3) leverages the RISC-V ISA with a set of new, specialized instructions to facilitate interacting with such controllers 215, 220 to atomically perform the user-defined operation. In desirable examples, the RISC-V ISA contains a full set of instructions that support high level language operators and data types. The PAU 270 can leverage the RISC-V ISA, but will commonly support a more limited set of instructions and limited register file size to reduce the die size of the unit when included within the memory controller chiplet 205.

As mentioned above, prior to the writing of the read data to the cache 210, the set hazard bit for the reserved cache line is to be cleared, by the memory hazard clear unit 260. Accordingly, when the request and read data is received by the write merge unit 255, a reset or clear signal can be transmitted by the memory hazard clear unit 260 to the cache 210 to reset the set memory hazard bit for the reserved cache line. Also, resetting this hazard bit will also release a pending read or write request involving the designated (or reserved) cache line, providing the pending read or write request to an inbound request multiplexer for selection and processing.

Figure 3:
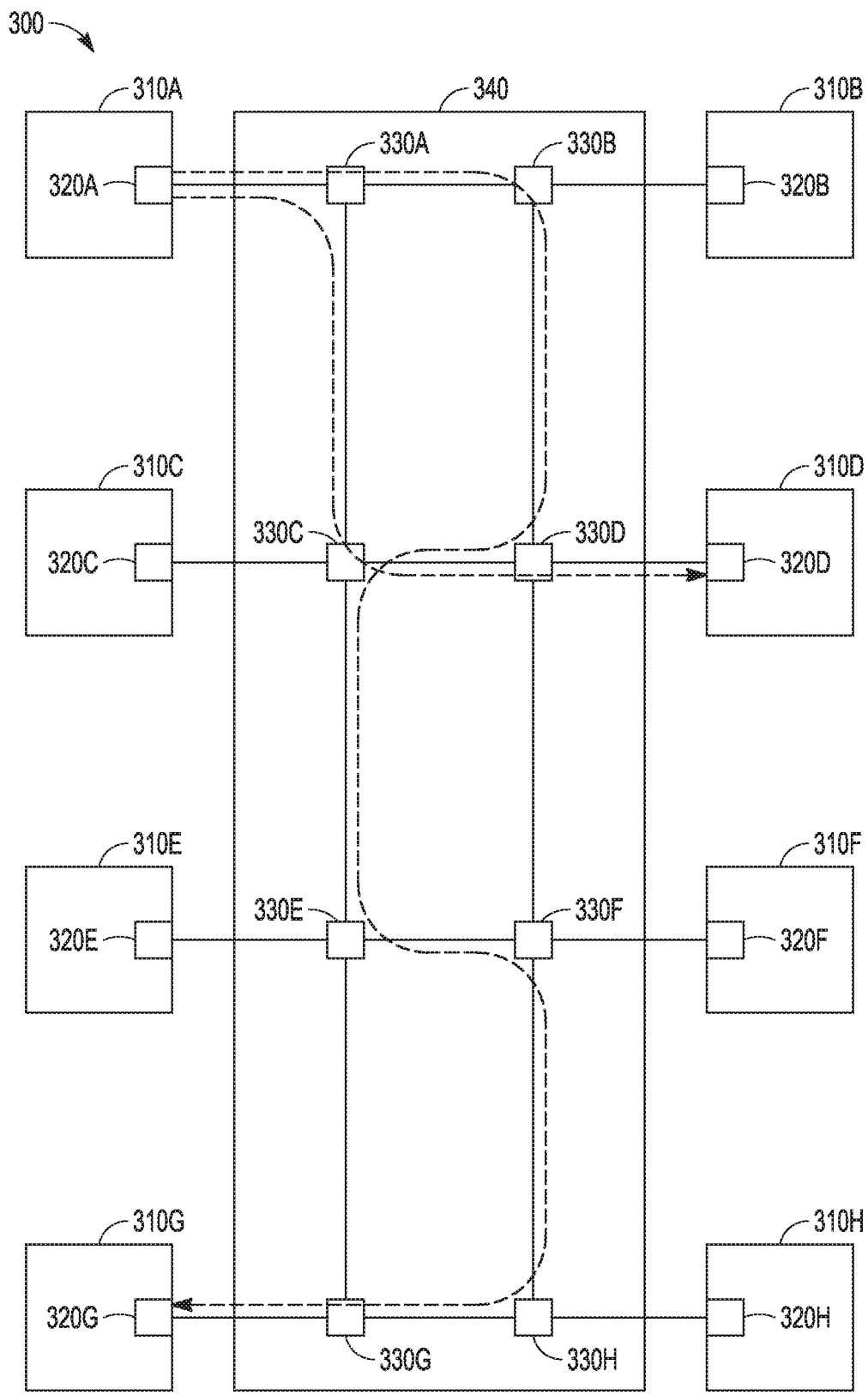
FIG. 3 illustrates an example of routing between electronic devices in a device layout using an interface network, such as between chiplets in a chiplet layout using a chiplet protocol interface (CPI) network, according to an embodiment.

FIG. 3 illustrates an example of routing between electronic devices in a device layout 300 using an interface network, such as between chiplets in a chiplet layout 300 using a chiplet protocol interface (CPI) network, according to an embodiment. The device layout 300 includes electronic devices, which in the present example may include one or more electronic devices in the form of an individual chiplet, 310A, 310B, 310C, 310D, 310E, 310F, 310G, and 310H, which are interconnected by a network comprising nodes 330A, 330B, 330C, 330D, 330E, 330F, 330G, and 330H. The nodes 330A-330H can be housed in a NOC 340 that is a separate chiplet or part of another chiplet (e.g., NOC 130 of FIG. 1 is illustrated as part of the application chiplet 125) or the nodes 330A-330H can be distributed in other structures of a chiplet system, such as in one or more of the chiplets 310A-310H. Each node may include one or more switches and/or transceivers, arranged and controlled to provide communications as described herein. The electronic devices 310A-310H each include one of hardware transceivers 320A-320H. In one embodiment, the electronic devices 310A-310H are each a chiplet, and the network is the CPI network. Thus, the device layout (or chiplet layout) 300 includes chiplets 310A, 310B, 310C, 310D, 310E, 310F, 310G, and 310H, which are interconnected by the CPI network comprising nodes 330A, 330B, 330C, 330D, 330E, 330F, 330G, and 330H. The chiplets 310A-310H each include one of the hardware transceivers 320A-320H.

CPI packets can be transferred between the chiplets 310 using an Advanced Interface Bus (AIB). The AIB provides physical layer functionality. The physical layer transmits and receives data using source synchronous data transfers with a forwarded clock. Packets are transferred across the AIB at SDR or DDR with respect to the transmitted clock. Various channel widths are supported by the AIB. AIB channel widths are in multiples of 20 bits when operated in SDR mode (20, 40, 60, ... ), and 40 bits for DDR mode: (40, 80, 120, ... ). The AIB channel width includes both transmit and receive signals. The channel may be configured to have a symmetrical number of transmit (TX) and receive (RX) input/outputs (I/Os), or have a non-symmetrical number of transmitters and receivers (e.g., either all transmitters or all receivers).

The AIB adapter provides an interface to the AIB link layer and an interface to the AIB physical layer (PHY). The AIB adapter provides data staging registers, power-on reset sequencers, and a control signal shift register.

The AIB physical layer consists of AIB I/O Cells. AIB I/O cells (implemented, in some example embodiments, by the hardware transceivers 320) may be input only, output only or bidirectional. An AIB channel is composed of a set of AIB I/O cells, the number of cells is dependent on the configuration of the AIB channel. The receive signals on one chiplet are connected to the transmit signals on the paired chiplet. In some example embodiments, each column comprises an auxiliary (AUX) channel and data channels numbered 0 to N.

Data packets are routed among the chiplets 310 by the network nodes 330. A node 330 may determine the next node 330 to forward a received data packet to based on one or more data fields of the data packet. For example, a source or destination address, source or destination port, virtual channel, or any suitable combination thereof may be hashed to select a successive network node or an available network path. Selecting paths in this way may serve to balance network traffic.

Thus, in FIG. 3, a data path is shown from the chiplet 310A to the chiplet 310D. The data packet is sent by the hardware transceiver 320A to the network node 330A; forwarded by the network node 330A to the network node 330C; forwarded by the network node 330C to the network node 330D; and delivered by the network node 330D to the hardware transceiver 320D of the chiplet 310D.

A second data path is also shown in FIG. 3, from the chiplet 310A to the chiplet 310G. The data packet is sent by the hardware transceiver 320A to the network node 330A; forwarded by the network node 330A to the network node 330B; forwarded by the network node 330B to the network node 330D; forwarded by the network node 330D to the network node 330C; forwarded by the network node 330C to the network node 330E; forwarded by the network node 330E to the network node 330F; forwarded by the network node 330F to the network node 330H; forwarded by the network node 330H to the network node 330G; and delivered by the network node 330G to the hardware transceiver 320G of the chiplet 310G. As is visually apparent in FIG. 3, multiple paths through the network are available for transmission of data between any pair of chiplets.

AIB I/O cells support three clocking modes: asynchronous (i.e. non-clocked), SDR, and DDR. The non-clocked mode is used for clocks and some control signals. The SDR mode may use dedicated SDR only I/O cells, or dual use SDR/DDR I/O cells.

CPI packet protocols (point-to-point and routable) may use an AIB channel in either SDR or DDR operation modes. In some example embodiments, the AIB channel shall be is in increments of 80 I/O cells (i.e. 40 TX and 40 RX) for SDR mode and 40 I/O cells for DDR mode.

CPI streaming protocol may use an AIB channel in either SDR or DDR operation modes. In some example embodiments, for both modes (SDR and DDR) the AIB channel is in increments of 40 I/O cells.

Each AIB channel is assigned a unique interface identifier. The identifier is used during CPI reset and initialization to determine paired AB channels across adjacent chiplets. In some example embodiments, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

In some example embodiments, AIB channels are numbered in continuous increasing order starting with the AIB channel adjacent to the AUX channel. The AIB channel adjacent to the AUX is defined to be AIB channel zero.

FIG. 3, by way of example, shows eight chiplets 310 connected by a network comprising eight nodes 330. More or fewer chiplets 310 and more or fewer nodes 330 may be included in the chiplet network, allowing a network of chiplets of arbitrary size to be created.

The data packets can be transmitted between the electronic devices (such as chiplets) 310 via the interface network (such as the CPI network) according to path and ordering requirements specified on a packet-by-packet basis. The data packets can each specify its own ordering requirement to allow for flexibility in ordering and routing control that increases data transmission performance by reducing unnecessary congestion, for example. In various embodiments, ordering and routing for the transmission of the data packets are determined to maximize data transmission performance while satisfying the ordering and/or routing requirements.

Figure 4:
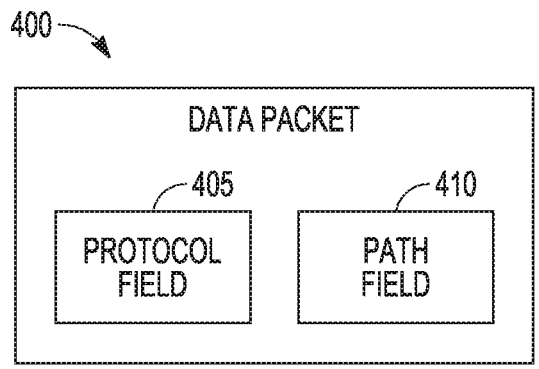
FIG. 4 is a block diagram of a data packet suitable for use in a system allowing for optional path ordering in packet transmission, in accordance with some embodiments of the present disclosure.

FIG. 4 is a block diagram of a data packet 400 suitable for use in a system allowing for optional path ordering in packet transmission, in accordance with some embodiments of the present disclosure. The system can include multiple electronic devices (e.g., the electronic devices 310A-310H) coupled to each other via the interface network (e.g., including nodes 330A-330H) and multiple hardware transceivers (e.g., the hardware transceivers 320A-320H) each included in or coupled to an electronic device of the multiple electronic devices. The multiple hardware transceivers can each receive data packets from a source device of the multiple electronic devices and transmit the received data packets to a destination device of the multiple electronic devices. These data packet can each be an instance of the data packet 400.

The data packet 400 includes a protocol field 405, a path field 410, and one or more additional fields containing any types of data for the operation of the system. The protocol field 405 specifies ordering information for delivery of the data packet 400 to the destination device of the multiple electronic devices. The ordering information requires an order of arrival of each data packet 400 at its destination device with respect to other data packets 400. The path field 410 specifies path information for routing the delivery of the data packet 400 to the destination device. After receiving each data packet 400, a hardware transceiver can transmit it to the destination device using at least the ordering information contained in that data packet, and can transmit it to the destination device using the ordering information and the path information contained in that data packet when the ordering information contained in that data packet indicates a need for routing the delivery of that data packet.

In one embodiment, the ordering information included in the protocol field 405 can be represented by one or more values selected from the values including (but not limited to):

A first value (e.g., 0) indicating an unordered delivery;
A second value (e.g., 1) indicating an ordered delivery and via a path specified in the path field 410; and
A third value (e.g., 2) indicating an ordered delivery through a single predetermined (e.g., default) path.

The data packets 400 being transmitted in the system that can include first packets (each having the first value in the protocol field), second packets (each having the second value in the protocol field), and/or third packets (each having the third value of the protocol field). The multiple hardware transceivers can each receive these data packets 400 and transmit the first packets to the destination device without a predetermined order, transmit the second packets to the destination device in a predetermined order through one or more paths in the interface network specified in the path fields, and transmit the third packets of the received data packets to the destination device in a predetermined order through a single predetermined path (e.g., a default path or a path set at the system boot time). For the ordered delivery, the data packets can be delivered in the order they are received by the hardware transceiver or otherwise predetermined at the source device from which they are received.

The protocol field 405 and the path field 410 are included in every data packet 400 transmitted in the system. For example, the protocol field 405 and the path field 410 can be included the header of every data packet 400. The protocol field 405 specifies whether the data packet is for unordered delivery, ordered delivery via a path specified in the path field, or ordered delivered via a single predetermined path.

The path field 410 specifies the path when the protocol field of that packet specifies ordered delivery via the path specified in the path field, and can be ignored for the path selection when the protocol field specifies unordered delivery or ordered delivered via a single predetermined path. In one example, the system includes the chiplet layout 300 as illustrated in FIG. 3, with the multiple electronic devices each being a chiplet and the data packets transmitted between the chiplets using the CPI network. In this example, chiplets 310A-310H each represent an example of an electronic device of the multiple electronic devices, hardware transceivers 320A-320H each represent a hardware transceiver of the multiple hardware transceivers, and the CPI network represent an example of the interface network. The data packets 400 can include data packets transmitted in the CPI network.

Figure 5:
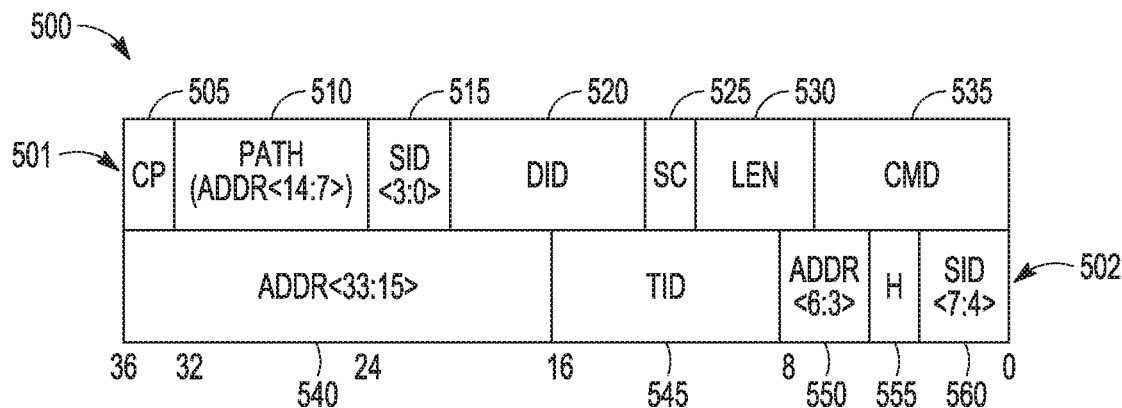
FIG. 5 is a block diagram of a data packet being a specific example of the data packet of FIG. 4, in accordance with some embodiments of the present disclosure.

FIG. 5 is a block diagram of a data packet 500 suitable for transmission in the CPI network, in accordance with some embodiments of the present disclosure. The data packet 500 can represent an example of the data packet 400 when used in packet transmission in the CPI network. As illustrated in FIG. 5 by way of example, the data packet 500 is divided into flow control units (flits), each of which is composed of 36 bits. A first flit 501 (e.g., the header) of the data packet 500 includes a credit/path order (CP) field 505, a path (PATH) field 510, a source identifier (SID) field 515 (e.g., a first four bits of an eight bit SID), a destination identifier (DID) field 520, a sequence continue (SC) field 525, a length (LEN) field 530, and a command (CMD) field 535. A second flit 502 of data packet 500 includes additional data that may not be relevant to the routing of the packet but used by a recipient. Here, the second flit includes an address (ADDR) (e.g., a memory address) divided into two fields—the ADDR fields with the field 540 holding bits fifteen through thirty-three of the address and the field 550 holding bits three through six of the address—a transaction identifier (TID) field 545, a "half word" (H) field 555, and field 560 to hold the remainder (e.g., last four bits) of the SID. The data packet 500 can include any number of flits, in various embodiments of the present disclosure, other flits possibly having differing fields than those illustrated in FIG. 5.

The CP field 505, which can represent an example of the protocol field 405, is a two-bit field that indicates whether unordered delivery is used (e.g., to allow deliver with a random order), ordered delivery through one path from source to destination is used, or delivery using a path specified by the PATH field 510 is used. The PATH field 510, which can represent an example of the path field 410, is an eight-bit field (e.g., populated by an eight-bit address of the destination device, as illustrated in FIG. 5). Table 1 list an example description of values of the CP field 505. These field sizes and values are for example only and can include any sizes and values required to accommodate the ordering information and the path information.

TABLE 1

| CP Field Value | Description |
| --- | --- |
| 0 | Unordered |
| 1 | PATH field-based path ordering |
| 2 | Single path ordering |
| 3 | Reserved |

The data packets 500 with their CP fields 505 is set to 0 can be delivered without any particular order. The PATH field 510 can be ignored. The data packets 500 can be routed without regard to the value of the PATH field 510, and can be received by the destination device in an order different from the order they were sent by the source device. This avoids congestion and allows for greater throughput in the CPI network.

The data packets 500 with their CP fields 505 is set to 1 have their PATH field 510 specifying a common path value are transmitted in the order they are sent (or otherwise specified) by the source device. The PATH field 510 is used to determine this path, through which all data packets 500 having the same value in this field are guaranteed to be delivered through the same path through the CPI network. In this example, the PATH field 510 includes address bits 14:7 specifying the path. All the data packets 500 having the CP field 505 set to 1 and the PATH field 510 set to a common address are transmitted in order from their source device to their destination device through the same path as identified by the common address in the CPI network. This ensures proper operations of the system that depend on ordered delivery of the data packets through a path specified in the packets.

The data packets 500 with their CP fields 505 is set to 2 can be transmitted in order through a single predetermined path from the source device to the destination device. The single predetermined path can be considered a system default path unrelated to the value of the PATH field 510 (which can have any value). All the data packets 500 having the CP field 505 set to 2 and regardless of the value(s) of their PATH field 510 are transmitted in order from their source device to their destination device through the predetermined path. This ensures proper operations of the system that depend on ordered delivery of the data packets through a predetermined path such as a system default path.

The value 3 for the CP field 505 is reserved for potential future use (e.g., when another type of ordered or unordered delivery is needed). When the value 3 is not used, it can be defaulted to the description of another value. For example, the data packets 500 with their CP fields 505 set to either 1 or 3 can be transmitted in the same manner when the value 3 is "reserved" (not used for another manner of transmission).

Use of the CP field 505 and the PATH field 510 in each of the data packets 500 provides flexible network support for multiple ordering requirements, without degrading performance for use cases that do not require all packets to be ordered. Because the ordering information is provided on a packet-by-packet basis, instead of setting the ordering scheme for all the data packets being transmitted, the data packets with different ordering requirements can pass through the CPI network in temporal and spatial arrangements determined to maximize performance for the packet-based data transmission. For example, it allows for simultaneous transmission of data packets via different paths.

The remaining fields of the data packet 500 are illustrated as an example and may not affect the order and path of its transmission except for identifying the source and destination devices. The SID field 515 stores a four-bit SID. The SID uniquely identifies the source device in the network (e.g., the source chiplet). The DID field 520 stores a twelve-bit DID. The DID uniquely identifies the destination device in the network (e.g., the destination chiplet). A sequence of data packets all having the SC field 525 set are guaranteed to be delivered in order. The LEN field 530 is a five-bit field that indicates the number of flits that comprise the data packet 500. Interpretation of the LEN field 530 may be non-linear. For example, values 0-22 may be interpreted as 0-22 flits in the data packet 500 and values 23-27 may be interpreted as 33-37 flits in the data packet 500 (i.e., 10 more than the indicated value). Other values of the LEN field 530 may be vendor defined instead of protocol defined.

The command for the data packet 500 is stored in the CMD field 535, a seven-bit field. The command may be a write command, a read command, a predefined atomic operation command, a custom atomic operation command, a read response, an acknowledge response, or a vendor-specific command. Additionally, the command may indicate a virtual channel of the data packet 500. For example, different commands may be used for different virtual channels or 1, 2, 3, or 4 bits of the seven-bit CMD field 535 may be used to indicate the virtual channel and the remaining bits may be used to indicate the command.

The memory access commands may further identify a number of bytes to be written or accessed, a memory space to access (e.g., the off-die memory 375 or an instruction memory for custom atomic operations), or any suitable combination thereof. In some example embodiments, the command may indicate that additional bits of a later flit identify the command.

The ADDR fields, when combined, specify a memory address to be accessed by the request. As illustrated, however, the ADDR field 540 in the header holds a portion of the address that can be used to determine a routing path depending upon the CP value. The TID field 545 identifies the transaction associated with the data packet 500. The H field 555 contains an additional address bit needed when half-word accesses are used. The SID field 560 stores another four-bit SID when the four bits of the SID field 515 is insufficient for identifying the source device in the network (e.g., the source chiplet).

Figure 6:
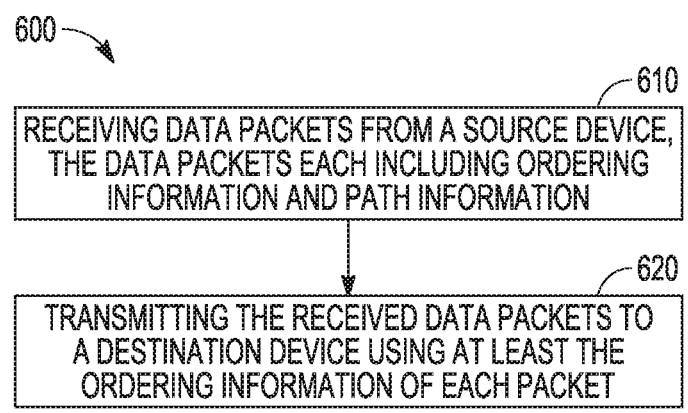
FIG. 6 is a flow chart showing operations of a method for optional path ordering in packet transmission, in accordance with some embodiments of the present disclosure.

FIG. 6 is a flow chart showing operations of a method 600 for optional path ordering in packet transmission, in accordance with some embodiments of the present disclosure. The method 600 can be performed for transmission of data packets between a source device and a destination device in a system including multiple electronic devices, such as chiplets, through an interface network connecting the multiple electronic devices to each other through various routes. In an example, the source device and/or the destination device are each a chiplet, and the interface network includes the CPI network as discussed in this disclosure. In an example, the multiple electronic devices include memory devices.

At 610, data packets are received from the source device. The data packets each include ordering information for delivery to the destination device and path information for routing the delivery via the interface network to the destination device.

At 620, the received data packets are transmitted to the destination device using at least the ordering information of each packet of the received data packets. The received data packets are transmitted to the destination device using the ordering information of each packet of the received data packets and path information of each packet of the received data packets in which the ordering information indicates a need for routing the delivery of the packet. In response to the ordering information specifying the ordered delivery, the received data packets are transmitted to the destination device using an ordered delivery. In response to the ordering information specifying the unordered delivery, the received data packets are transmitted to the destination device using an unordered delivery.

Figure 7:
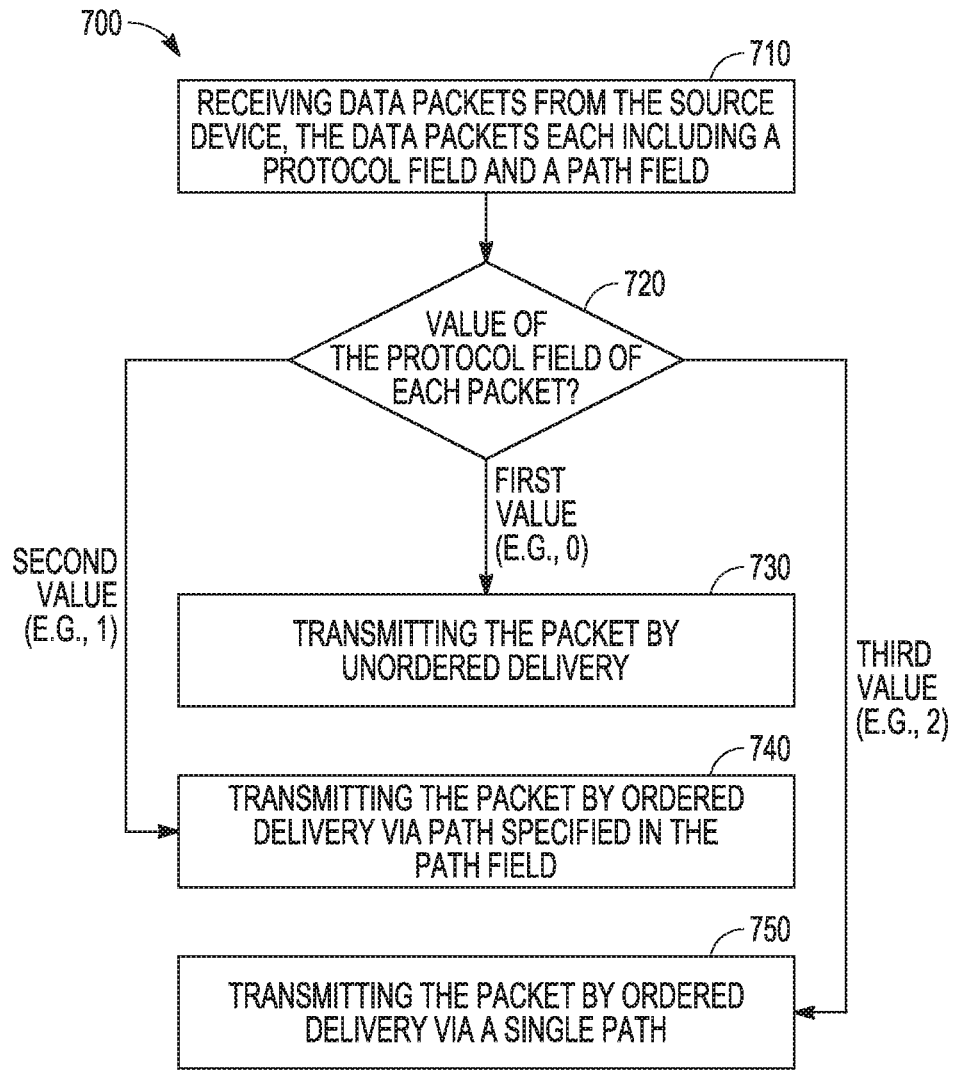
FIG. 7 is a flow chart showing operations of a method for optional path ordering in packet transmission using protocol field values contained in packets being transmitted, in accordance with some embodiments of the present disclosure.

FIG. 7 is a flow chart showing operations of a method 700 for optional path ordering in packet transmission using protocol field values contained in packets being transmitted, in accordance with some embodiments of the present disclosure. The method 700 can represent a further embodiment of the method 600 for transmitting the data packets between the source device and the destination device in the system including the multiple electronic devices, such as chiplets, through the interface network connecting the multiple electronic devices to each other through various routes.

At 710, data packets are received from the source device. The data packets each include a protocol field specifying the ordering information for delivery to the destination device and a path field specifying the path information for routing the delivery via the interface network to the destination device. An example of the data packets is the data packets 400, with the data packet 500 being a more specific example for use in the CPI network.

At 720, value of the protocol field for each received data packet is determined. In one example, the protocol field can have one of at least three values: a first value (e.g., 0), a second value (e.g., 1), and a third value (e.g., 2). The first value indicates an unordered delivery. The second value indicates an ordered delivery and through a path specified in the path field specifying a path for routing the delivery to the destination device. The third value indicates an ordered delivery through a single predetermined path (that is independent of the path field value). The ordered delivery requires the data packets to be delivered to the destination device in the order they are received from the source device or in an order that is otherwise specified, such as specified by the source device.

At 730, if the protocol field of the received data packet has the first value, the received data packet is transmitted to the destination device without a predetermined order. At 740, if the protocol field of the received data packet has the second value, the received data packet is transmitted to the destination device in a predetermined order through the path in the interface network specified in the path field. At 750, if the protocol field of the received data packet has the third value, the received data packet is transmitted to the destination device in a predetermined order through the single predetermined path.

Figure 8:
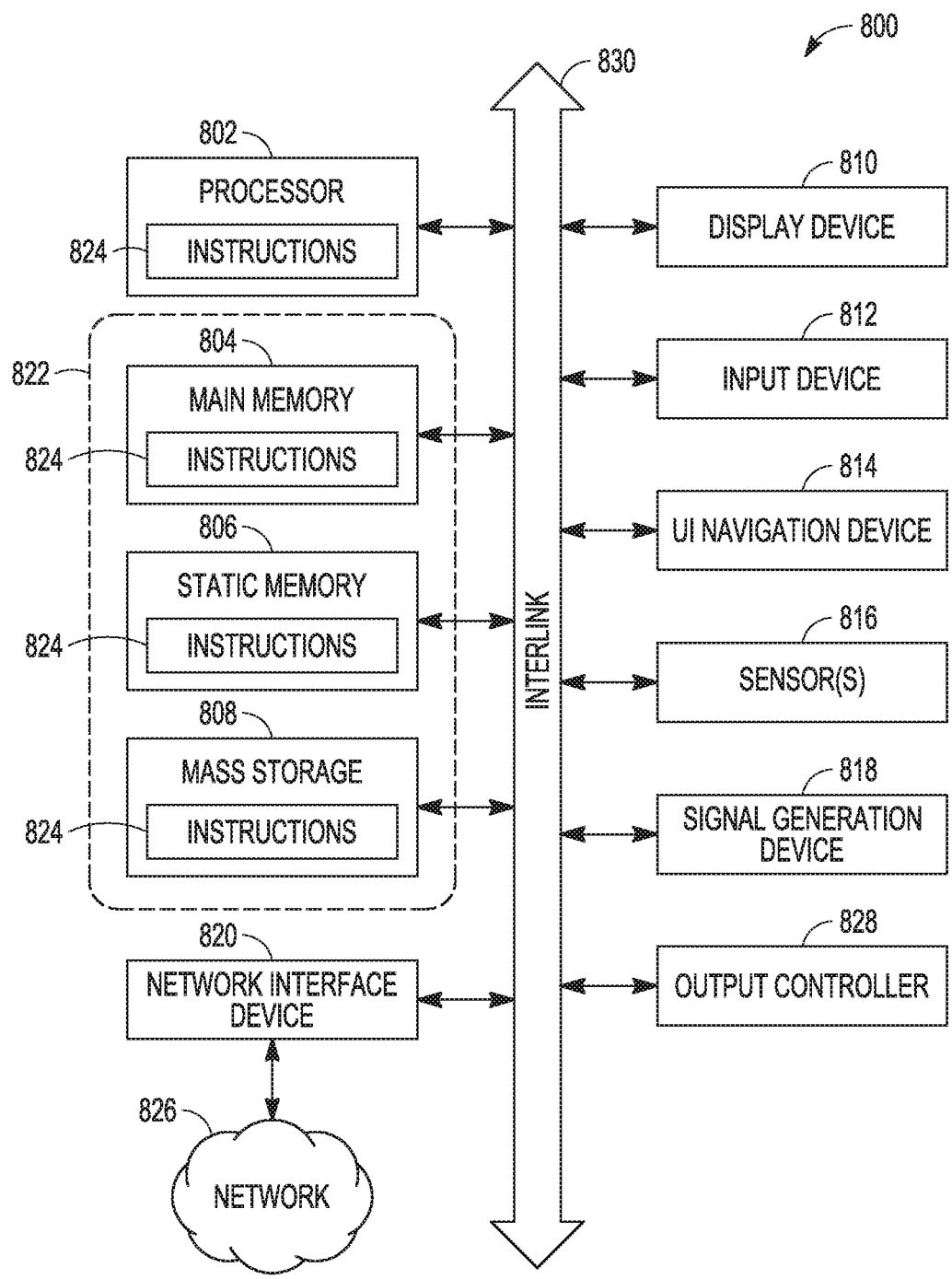
FIG. 8 is a block diagram of an example computer system in which embodiments of the present disclosure may operate.

FIG. 8 is a block diagram of an example machine 800 with which, in which, or by which any one or more of the techniques (e.g., the method 600 or the method 700) discussed herein can be implemented. Examples, as described herein, can include, or can operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 can include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drives, tape drives, flash storage, or other block devices) some or all of which can communicate with each other via an interlink (e.g., bus) 830. The machine 800 can further include a display unit 810, an alphanumeric input device 812 (e.g., a keyboard), and a user interface (UI) navigation device 814 (e.g., a mouse). In an example, the display unit 810, input device 812 and UI navigation device 814 can be a touch screen display. The machine 800 can additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 can be, or include, a machine-readable medium 822 on which is stored one or more sets of data structures or instructions 824 (e.g., software) embodying or utilized by any one or more of the techniques or functions described herein. The instructions 824 can also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 can constitute the machine-readable media 822. While the machine-readable medium 822 is illustrated as a single medium, the term "machine-readable medium" can include a single medium or multiple media (e.g., a centralized or distributed database, or associated caches and servers) configured to store the one or more instructions 824.

The term "machine-readable medium" can include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine-readable media that do not include transitory propagating signals. Specific examples of non-transitory machine-readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable medium 822 can be representative of the instructions 824, such as instructions 824 themselves or a format from which the instructions 824 can be derived. This format from which the instructions 824 can be derived can include source code, encoded instructions (e.g., in compressed or encrypted form), packaged instructions (e.g., split into multiple packages), or the like. The information representative of the instructions 824 in the machine-readable medium 822 can be processed by processing circuitry into the instructions to implement any of the operations discussed herein. For example, deriving the instructions 824 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 824.

In an example, the derivation of the instructions 824 can include assembly, compilation, or interpretation of the information (e.g., by the processing circuitry) to create the instructions 824 from some intermediate or preprocessed format provided by the machine-readable medium 822. The information, when provided in multiple parts, can be combined, unpacked, and modified to create the instructions 824. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 824 can be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the communications network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine-readable medium.

In the foregoing specification, some example implementations of the disclosure have been described. It will be evident that various modifications can be made thereto without departing from the broader scope and spirit of the disclosure as set forth in the following claims. The specification and drawings are, accordingly, to be regarded in an illustrative sense rather than in a restrictive sense. Below is a non-exhaustive list of examples of implementations of the present disclosure. Throughout detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the spirit and scope of the present invention. References to "an", "one", or "various" embodiments in this disclosure are not necessarily to the same embodiment, and such references contemplate more than one embodiment. The following detailed description provides examples, and the scope of the present invention is defined by the appended claims and their legal equivalents.

In Example 1, a method is provided. The method may include receiving data packets from a source device of multiple electronic devices coupled to each other via an interface network. The data packets may each include a protocol field specifying ordering information for delivery to a destination device of the multiple electronic devices and a path field specifying path information for routing the delivery through the interface network to the destination device. The multiple electronic device may include multiple chiplets. The source device and the destination device may each include a chiplet of the multiple chiplets. The method may further include transmitting the received data packets to the destination device using at least the ordering information of each packet of the received data packets.

In Example 2, the subject matter of transmitting the received data packets to the destination device as found in Example 1 may optionally include transmitting first packets of the received data packets to the destination device without a predetermined order, transmitting second packets of the received data packets to the destination device in a predetermined order through one or more paths in the interface network specified in the second packets, and transmitting third packets of the received data packets to the destination device in a predetermined order through a single predetermined path. The first packets each have a first value of the protocol field indicating an unordered delivery. The second packets each have a second value of the protocol field indicating an ordered delivery and a value of the path field specifying a path for routing the delivery to the destination device. The third packet each have a third value of the protocol field indicating an ordered delivery through the single predetermined path.

In Example 3, the subject matter of transmitting the received data packets to the destination device as found in Example 1 may optionally include: transmitting the received data packets to the destination device using an ordered delivery in response to the ordering information specifying the ordered delivery, and transmitting the received data packets to the destination device using an unordered delivery in response to the ordering information specifying the unordered delivery.

In Example 4, the subject matter of transmitting the received data packets to the destination device as found in Example 3 may optionally include transmitting the received data packets to the destination device using the ordering information of each packet of the received data packets and the path information of each packet of the received data packets in which the ordering information indicates a need for using the path information.

In Example 5, the subject matter of transmitting the received data packets to the destination device as found in Example 1 may optionally include at least one of transmitting first packets of the received data packets to the destination device without a predetermined order, transmitting second packets of the received data packets to the destination device in a predetermined order through one or more paths in the interface network specified in the second packets, or transmitting third packets of the received data packets to the destination device in a predetermined order through a single predetermined path. The first packets each have a first value of the protocol field indicating an unordered delivery. The second packets each have a second value of the protocol field indicating an ordered delivery and a value of the path field specifying a path for routing the delivery to the destination device. The third packet each have a third value of the protocol field indicating an ordered delivery through the single predetermined path.

In Example 6, the data packets as found in any one or any combination of Examples 1 to 5 may optionally include commands for operating a memory device including the multiple electronic devices.

In Example 7, a system may include multiple electronic devices and multiple hardware transceivers. The multiple electronic devices may include multiple chiplets and may be coupled to each other via an interface network. The multiple hardware transceivers may each be included in or coupled to a respective electronic device of the multiple electronic devices. The multiple hardware transceivers may each be configured to receive data packets from a source device. The data packets each include a protocol field specifying ordering information for delivery to a destination device and a path field specifying path information for routing the delivery to the destination device. The source device and the destination device may each include a chiplet of the multiple chiplets. The multiple hardware transceivers may each be further configured to transmit the received data packets to the destination device using at least the ordering information of each packet of the received data packets.

In Example 8, the subject matter of Example 7 may optionally be configured such that the multiple hardware transceivers are each configured to transmit the received data packets to the destination device using an ordered delivery in response to the ordering information specifying the ordered delivery and an unordered delivery in response to the ordering information specifying the unordered delivery.

In Example 9, the subject matter of any one or any combination of Examples 7 and 8 may optionally be configured such that the multiple hardware transceivers are each configured to transmit the received data packets to the destination device using the ordering information of each packet of the received data packets and the path information of each packet of the received data packets in which the ordering information indicates a need for using the path information.

In Example 10, the subject matter of any one or any combination of Examples 7 to 9 may optionally be configured such that the multiple hardware transceivers are each configured to transmit first packets of the received data packets to the destination device without a predetermined order. The first packets each have a first value of the protocol field indicating an unordered delivery.

In Example 11, the subject matter of any one or any combination of Examples 7 to 10 may optionally be configured such that the multiple hardware transceivers are each configured to transmit second packets of the received data packets to the destination device in a predetermined order through one or more paths in the interface network specified in the second packets. The second packets each have a second value of the protocol field indicating an ordered delivery and a value of the path field specifying a path for routing the delivery to the destination device.

In Example 12, the subject matter of any one or any combination of Examples 7 to 11 may optionally be configured such that the multiple hardware transceivers are each configured to transmit third packets of the received data packets to the destination device in a predetermined order through a single predetermined path. The third packets each have a third value of the protocol field indicating an ordered delivery through the single predetermined path.

In Example 13, the subject matter of Example 7 may optionally be configured such that the multiple hardware transceivers are each configured to transmit at least one of first packets of the received data packets to the destination device without a predetermined order, second packets of the received data packets to the destination device in a predetermined order through one or more paths in the interface network specified in the second packets, or third packets of the received data packets to the destination device in a predetermined order through a single predetermined path. The first packets each have a first value of the protocol field indicating an unordered delivery. The second packets each have a second value of the protocol field indicating an ordered delivery and a value of the path field specifying a path for routing the delivery to the destination device. The third packets each have a third value of the protocol field indicating an ordered delivery through the single predetermined path.

In Example 14, the subject matter of any one or any combination of Examples 7 to 13 may optionally be configured to include a memory device including the chiplets and the chiplet protocol interface network, and such that the data packets each include a command field containing a memory access command.

In Example 15, a non-transitory machine-readable medium stores instructions that, when executed by a system, may cause the system to perform operations including: receiving data packets from a source device of multiple electronic devices including multiple chiplets and coupled to each other via an interface network, and transmitting the received data packets to the destination device using at least ordering information of each packet of the received data packets. The data packets each including a protocol field specifying the ordering information for delivery to a destination device of the multiple electronic devices and a path field specifying path information for routing the delivery through the interface network to the destination device. The source device and the destination device may each include a chiplet of the multiple chiplets.

In Example 16, the subject matter of transmitting the received data packets to the destination device as found in Example 15 may optionally include transmitting first packets of the received data packets to the destination device without a predetermined order, transmitting second packets of the received data packets to the destination device in a predetermined order through one or more paths in the interface network specified in the second packets, and transmitting third packets of the received data packets to the destination device in a predetermined order through a single predetermined path. The first packets each have a first value of the protocol field indicating an unordered delivery. The second packets each have a second value of the protocol field indicating an ordered delivery and a value of the path field specifying a path for routing the delivery to the destination device. The third packet each have a third value of the protocol field indicating an ordered delivery through the single predetermined path.

In Example 17, the subject matter of transmitting the received data packets to the destination device as found in Example 15 may optionally include: transmitting the received data packets to the destination device using an ordered delivery in response to the ordering information specifying the ordered delivery, and transmitting the received data packets to the destination device using an unordered delivery in response to the ordering information specifying the unordered delivery.

In Example 18, the subject matter of transmitting the received data packets to the destination device as found in Example 17 may optionally include transmitting the received data packets to the destination device using the ordering information of each packet of the received data packets and the path information of each packet of the received data packets in which the ordering information indicates a need for using the path information.

In Example 19, the subject matter of transmitting the received data packets to the destination device as found in Example 15 may optionally include at least one of transmitting first packets of the received data packets to the destination device without a predetermined order, transmitting second packets of the received data packets to the destination device in a predetermined order through one or more paths in the interface network specified in the second packets, or transmitting third packets of the received data packets to the destination device in a predetermined order through a single predetermined path. The first packets each have a first value of the protocol field indicating an unordered delivery. The second packets each have a second value of the protocol field indicating an ordered delivery and a value of the path field specifying a path for routing the delivery to the destination device. The third packet each have a third value of the protocol field indicating an ordered delivery through the single predetermined path.

In Example 20, the data packets as found in any one or any combination of Examples 15 to 19 may optionally include commands for operating a memory device including the multiple electronic devices.

What is claimed is:

1. A method, comprising: receiving data packets from a source device of multiple electronic devices including multiple chiplets and coupled to each other via an interface network, the data packets each including a protocol field specifying ordering information for delivery to a destination device of the multiple electronic devices and a path field specifying path information for routing the delivery through the interface network to the destination device, the source device and the destination device each including a chiplet of the multiple chiplets; transmitting first packets of the received data packets to the destination device without a predetermined order, the first packets each having a first value of the protocol field indicating an unordered delivery; and transmitting second packets of the received data packets to the destination device in a predetermined order through one or more paths in the interface network specified in the second packets, the second packets each having a second value of the protocol field indicating an ordered delivery and a value of the path field specifying a path for routing the delivery to the destination device.

2. The method of claim 1, further comprising transmitting third packets of the received data packets to the destination device in a predetermined order through a single predetermined path, the third packets each having a third value of the protocol field indicating an ordered delivery through the single predetermined path.

3. The method of claim 2, wherein transmitting the second packets comprises transmitting the second packets in the order by which the second packets are received, and transmitting the third packets comprises transmitting the third packets in the order by which the third packets are received.

4. The method of claim 2, wherein transmitting the second packets comprises transmitting the second packets in an order predetermined at the source device from which the second packets are received, and transmitting the third packets comprises transmitting the third packets in the order predetermined at the source device from which the third packets are received.

5. The method of claim 1, wherein the data packets contain commands for operating a memory device including the multiple electronic devices.

6. The method of claim 5, further comprising transmitting third packets of the received data packets to the destination device in a predetermined order through a single predetermined path, the third packets each having a third value of the protocol field indicating an ordered delivery through the single predetermined path.

7. The method of claim 1, further comprising determining the ordering information on a packet-by-packet basis.

8. The method of claim 1, further comprising transmitting multiple data packets of the received data packets simultaneously through different paths in the interface network to the respective destination devices.

9. A system comprising:
multiple electronic devices coupled to each other via an interface network, the multiple electronic devices including multiple chiplets; and multiple hardware transceivers each included in or coupled to a respective electronic device of the multiple electronic devices, the multiple hardware transceivers each configured to:
receive data packets from a source device, the data packets each including a protocol field specifying ordering information for delivery to a destination device and a path field specifying path information for routing the delivery to the destination device, the source device and the destination device each including a chiplet of the multiple chiplets;
transmit first packets of the received data packets to the destination device without a predetermined order, the first packets each having a first value of the protocol field indicating an unordered delivery; and
transmit second packets of the received data packets to the destination device in a predetermined order through one or more paths in the interface network specified in the second packets, the second packets each having a second value of the protocol field indicating an ordered delivery and a value of the path field specifying a path for routing the delivery to the destination device.

10. The system of claim 9, wherein the multiple hardware transceivers are each further configured to transmit third packets of the received data packets to the destination device in a predetermined order through a single predetermined path, the third packets each having a third value of the protocol field indicating an ordered delivery through the single predetermined path.

11. The system of claim 9, comprising a memory device including the multiple chiplets and the interface network, wherein the data packets each include a command field containing a memory access command.

12. The system of claim 11, wherein the multiple hardware transceivers are each configured to transmit:
the first packets to the destination device without a predetermined order;
the second packets to the destination device in the predetermined order through the one or more paths in the interface network specified in the second packets; and
third packets of the received data packets to the destination device in a predetermined order through a single predetermined path, the third packets each having a third value of the protocol field indicating an ordered delivery through the single predetermined path.

13. The system of claim 11, wherein the memory device comprises memory device chiplets of multiple storage technologies.

14. The system of claim 11, wherein the memory device comprises a memory device chiplet including stacked memory die of multiple storage technologies.

15. A non-transitory machine-readable medium that stores instructions that, when executed by a system, cause the system to perform operations comprising: receiving data packets from a source device of multiple electronic devices coupled to each other via an interface network, the data packets each including a protocol field specifying ordering information for delivery to a destination device of the multiple electronic devices and a path field specifying path information for routing the delivery through the interface network to the destination device, the multiple electronic devices including multiple chiplets, the source device and the destination device each including a chiplet of the multiple chiplets; transmitting first packets of the received data packets to the destination device without a predetermined order, the first packets each having a first value of the protocol field indicating an unordered delivery; and transmitting second packets of the received data packets to the destination device in a predetermined order through one or more paths in the interface network specified in the second packets, the second packets each having a second value of the protocol field indicating an ordered delivery and a value of the path field specifying a path for routing the delivery to the destination device.

16. The non-transitory machine-readable medium of claim 15, wherein the operations further comprise transmitting third packets of the received data packets to the destination device in a predetermined order through a single predetermined path, the third packets each having a third value of the protocol field indicating an ordered delivery through the single predetermined path.

17. The non-transitory machine-readable medium of claim 15, wherein the data packets contain commands for operating a memory device including the multiple electronic devices.

18. The non-transitory machine-readable medium of claim 17, wherein the operations further comprise transmitting third packets of the received data packets to the destination device in a predetermined order through a single predetermined path, the third packets each having a third value of the protocol field indicating an ordered delivery through the single predetermined path.

19. The non-transitory machine-readable medium of claim of claim 15, wherein the operations further comprise determining the ordering information on a packet-by-packet basis.

20. The non-transitory machine-readable medium of claim of claim 19, wherein the operations further comprise transmitting multiple data packets of the received data packets simultaneously through different paths in the interface network to the respective destination devices.

* * * * *